United States Patent [19]

Nishina et al.

[11] Patent Number: 4,955,560
[45] Date of Patent: Sep. 11, 1990

[54] ELECTRO MOTOR HELICOPTER

[76] Inventors: Edward T. Nishina, 78-6401 Mamalahoa Hwy., Holualoa, Hi. 96725; George Spector, 233 Broadway Rm 3815, New York, N.Y. 10007

[21] Appl. No.: 330,646
[22] Filed: Mar. 30, 1989
[51] Int. Cl.$^5$ ............................................. B64D 37/00
[52] U.S. Cl. ..................................... 244/53 R; 244/58
[58] Field of Search .................. 244/53 R, 58; 446/36, 446/57

[56] References Cited

U.S. PATENT DOCUMENTS 1,397,062 11/1921 Smith ........................................ 244/58
1,634,167 6/1927 Wilson ..................................... 244/58
3,069,116 12/1962 Ward ........................................ 244/58

FOREIGN PATENT DOCUMENTS 672822 3/1939 Fed. Rep. of Germany ........ 244/58

Primary Examiner—Charles T. Jordan
Assistant Examiner—Richard W. Wendtland

[57] ABSTRACT

An electromotor helicopter is provided in which a downward maneuvering of the helicopter will operate a propeller directly connected to a generator to regenerate a battery carried in the helicopter while another battery operates a drive assembly of the helicopter. A switching system can alternately cause the generator to regenerate one battery while other battery operates the drive assembly.

4 Claims, 1 Drawing Sheet

ELECTRO MOTOR HELICOPTER

BACKGROUND OF THE INVENTION

The instant invention relates generally to electrically powered aircraft and more specifically it relates to an electromotor helicopter.

Numerous electrically powered aircraft have been provided in prior art that are adapted to include motors which receive their power from a power supply carried within the aircraft. For example, U.S. Pat. Nos. 2,368,630; 3,937,424 and 4,709,882 all are illustrative of such prior art. While these units may be suitable for the particular purpose to which they address, they would not be as suitable for the purposes of the present invention as heretofore described.

SUMMARY OF THE INVENTION

A primary object of the present invention is to provide an electromotor helicopter that will overcome the shortcomings of the prior art devices.

Another object is to provide an electromotor helicopter in which a downward maneuvering of the helicopter will operate a propeller directly connected to a generator to regenerate a battery carried in the helicopter while another battery operates a drive assembly of the helicopter.

An additional object is to provide an electromotor helicopter that includes a switching system which can alternately cause the generator to regenerate one battery while other battery operates the drive assembly.

A further object is to provide an electromotor helicopter that is simple and easy to use.

A still further object is to provide an electromotor helicopter that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
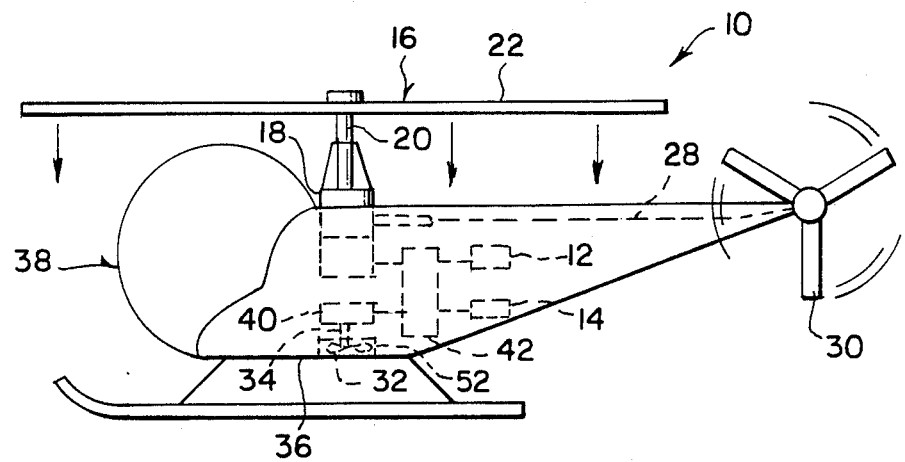
FIG. 1 is a side elevational view of a helicopter embodying the invention.
Figure 2:
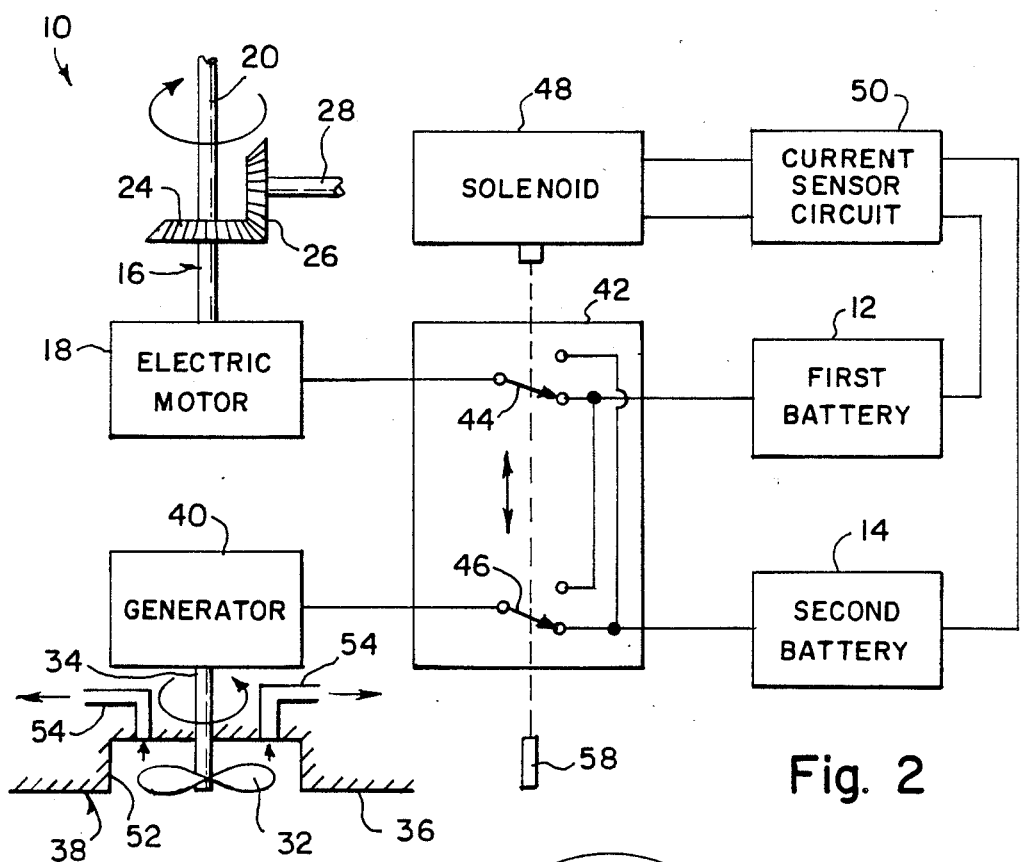
FIG. 2 is a schematic block diagram of the electrical system of the invention.
Figure 3:
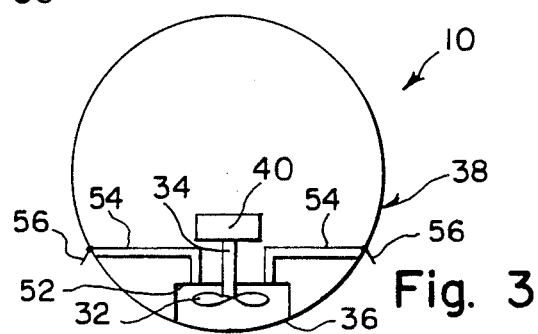
FIG. 3 is a diagrammatic front view of the helicopter showing flow of air for actuating the generator.

Turning now descriptively to the drawings, in which similar reference characters denote similar elements throughout the several views, FIGS. 1, 2 and 3 illustrate an electromotor helicopter 10 that contains a pair of batteries 12 and 14 in which the first battery 12 is used as a source of electrical energy to supply power to a drive assembly 16 of the helicopter 10 while the second battery 14 is held in reserve to be recharged.

The drive assembly 16 includes an electric motor 18 that turns a vertical shaft 20 which operates a main rotor blade 22. The vertical shaft 20 has bevel gears 24 which engages with a mating bevel gear 26 which operates a rearwardly extending drive shaft 28 that in turn operates anti-torque rotor blades 30.

A propeller 32 has a drive shaft 34 rotatably mounted to underside 36 of fuselage 38 of the helicopter 10. A generator 40 is mechanically connected to the drive shaft 34 and electrically connected to the second battery 14 so that a downward maneuvering of the helicopter 10 will cause the propeller 32 to turn the drive shaft 34 to operate the generator 40 for recharging the second battery 14.

A double-pole double-throw switch 42 is provided for changing the electrical positions of the batteries 12 and 14 so that the second battery 14 can now be electrically connected to the drive assembly 16 while the first battery 12 can now be placed in reserve to be recharged by the generator 40. One arm 44 of the switch 42 is electrically connected to the drive assembly 16 while other arm 46 is electrically connected to the generator 40.

A solenoid 48 is mechanically connected to the arms 44 and 46 of the switch 42. A current sensor 50 is electrically connected between the solenoid 48 and the batteries 12 and 14. When one of the batteries, such as the second battery 14, being recharged reaches a predetermined charge the current sensor circuit 50 will be activated operating the solenoid 48, so as to move arms 44 and 46 of the switch 42 and change the electrical positions of the batteries 12 and 14 which are electrically connected to the terminals of the switch 42.

The underside 36 of the fuselage 38 has a recess 52 in which the propeller 32 is rotatably mounted therein. Air vents 54 extend from the recess 52 to sides of the fuselage 38. One way valves 56 are each mounted at distal end of one air vent 54 at side of the fuselage 38 so that the propeller 32 will only turn during the downward maneuvering of the helicopter 10.

In operation, when the helicopter 10 is maneuvered downwardly the propeller 32 will turn to operate the generator 40 which will charge the battery 14 that is in reserve while the other battery 12 is being used to operate the drive assembly 16. When the battery 14 reaches its proper charge the switch 42 will change its position by the solenoid 48 activated by the current sensor circuit 50 so that battery 12 will now be charged while other battery 14 will operate the drive assembly 16. The switch 42 can be manually operated by lever 58 to by-pass the solenoid 48 when so desired.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An electromotor helicopter having a fuselage and drive assembly further comprising:
   (a) a pair of batteries in which said first battery is used as a source of electrical energy to supply power to said drive assembly of the helicopter while said second battery is held in reserve to be recharged;
   (b) a propeller having a drive shaft rotatably mounted on said fuselage;
   (c) a generator mechanically connected to said drive shaft and electrically connected to said second battery so that a downward maneuvering of the helicopter will cause said propeller to turn said drive shaft to operate said generator for recharging said second battery; and (d) means for changing the electrical positions of said batteries so that said second battery can now be electrically connected to the drive assembly while said first battery can now be placed in reserve to be recharged by said generator.

2. An electromotor helicopter as recited in claim 1, wherein said electrical changing means is a double-pole double-throw switch with two arms and terminals in which one arm is electrically connected to the drive assembly while the other arm is electrically connected to said generator.

3. An electromotor helicopter as recited in claim 2, further comprising:

(a) a solenoid mechanically connected to the arms of said switch; and (b) a current sensor circuit electrically connected between said selenoid and said batteries so that one of said batteries being recharged reaches a predetermined charge said current sensor circuit will be activated operating said solenoid, so as to move said arms of said switch and change the electrical positions of said batteries which are electrically connected to the terminals of said switch.

4. An electromotor helicopter as recited in claim 3, further comprising:

(a) the fuselage having a recess in which said propeller is rotatably mounted therein and a side with a vent opening;

(b) an air vent extending from said recess to said opening;

(c) a one way valve mounted at said opening so that said propeller will only turn during the downward maneuvering of the helicopter.

* * * * *